(No Model.) 4 Sheets—Sheet 2.
S. D. TOMPKINS & T. H. WILLIAMS.
STEAM OR HOT WATER RADIATOR.
No. 397,527. Patented Feb. 12, 1889.
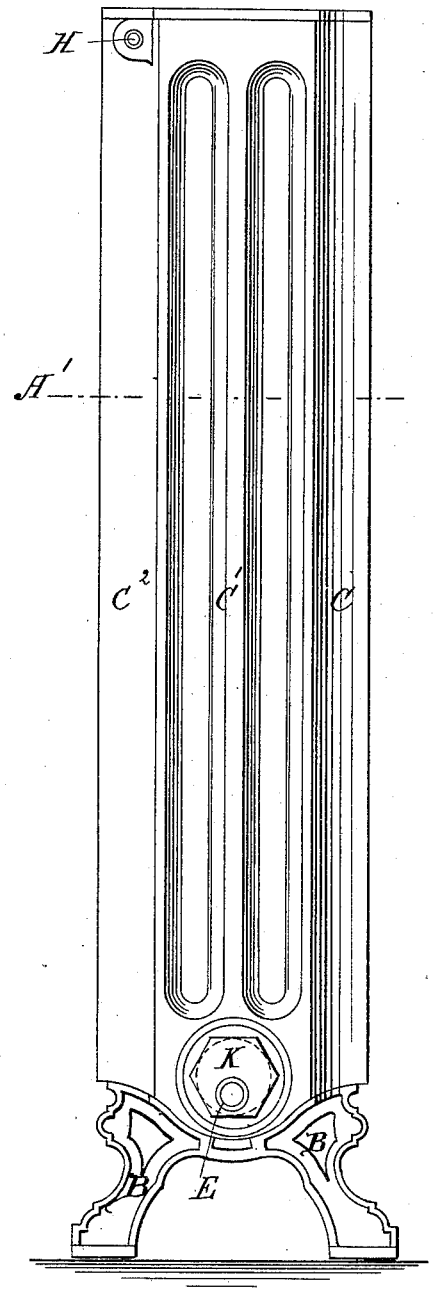
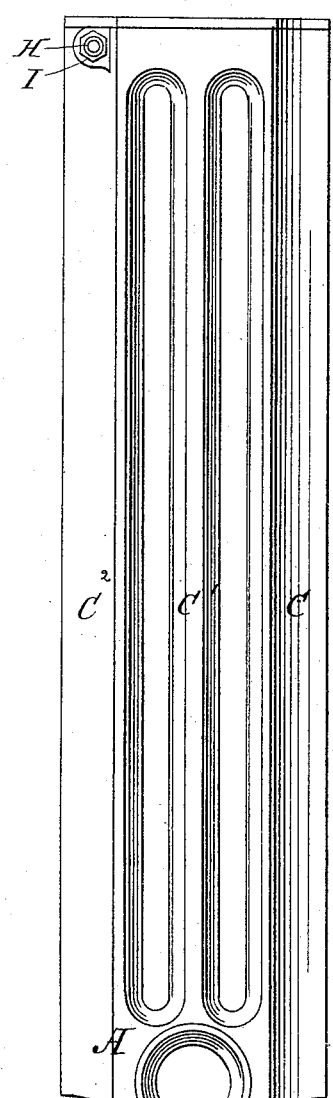
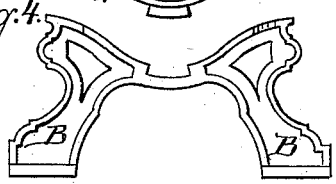
Witnesses.
John W. Ripley.
M. C. Kimmens.
Inventors.
Samuel Dusenbury Tompkins
Thomas Hilton Williams by
S. J. Gordon, their Atty.

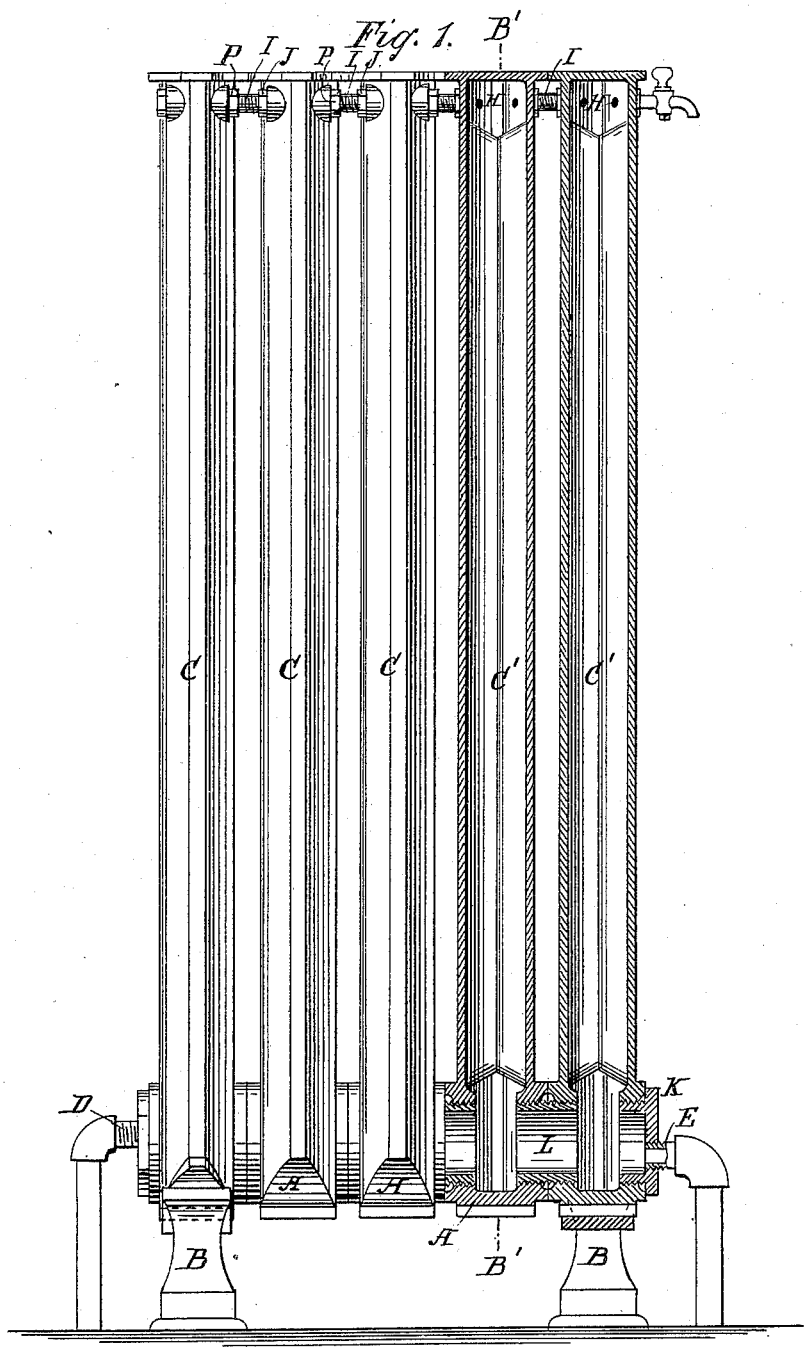

(No Model.) 4 Sheets—Sheet 3.
S. D. TOMPKINS & T. H. WILLIAMS.
STEAM OR HOT WATER RADIATOR.
No. 397,527. Patented Feb. 12, 1889.
Fig. 5. Fig. 5ᵃ
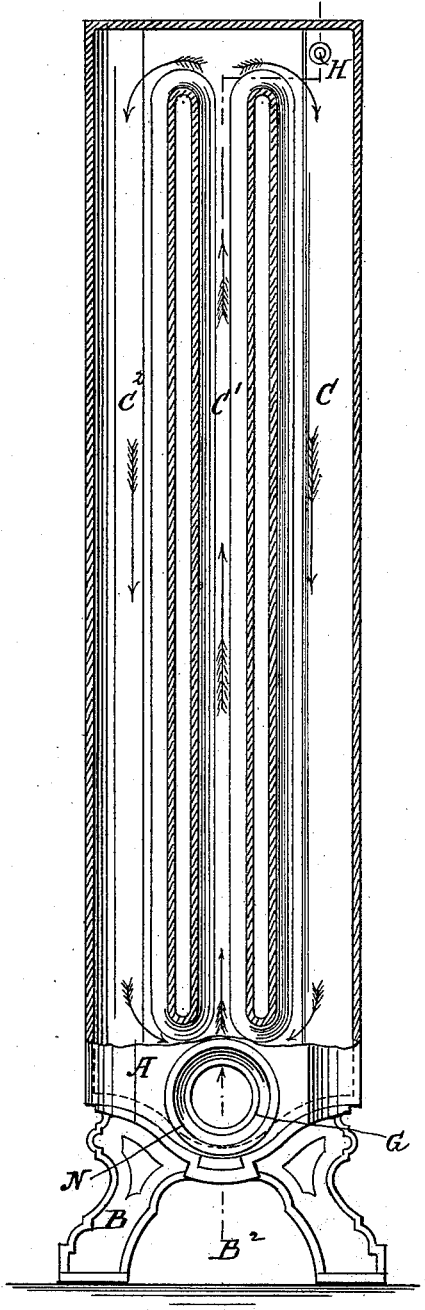
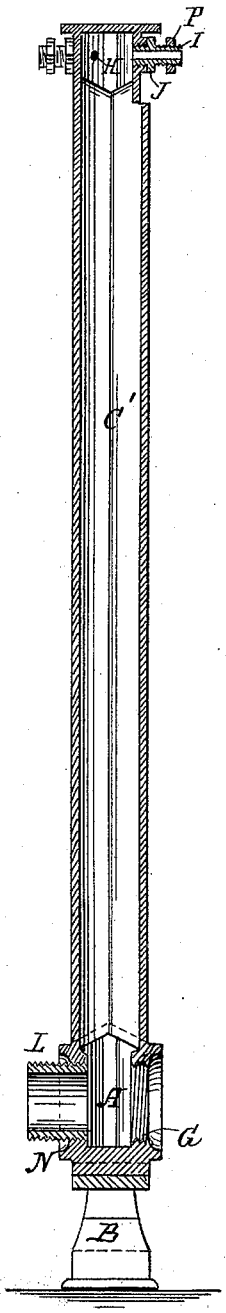
Witnesses.
John W. Papley.
Mac A. Van Deusen.
Inventors.
Samuel Dusenbury Tompkins
Thomas Hilton Williams by
G. J. Gordon, their Atty.

(No Model.) 4 Sheets—Sheet 4.
S. D. TOMPKINS & T. H. WILLIAMS.
STEAM OR HOT WATER RADIATOR.
No. 397,527. Patented Feb. 12, 1889.
*Fig. 6*
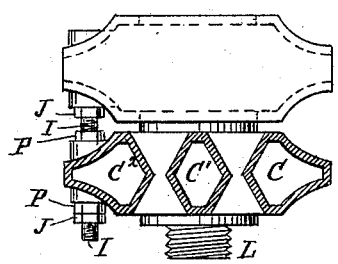
*Fig. 7.*  *Fig. 8.*
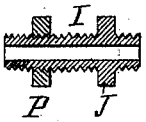 
*Fig. 11*  *Fig. 12.*
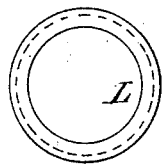 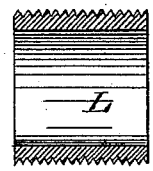
*Fig. 9*  *Fig. 10*
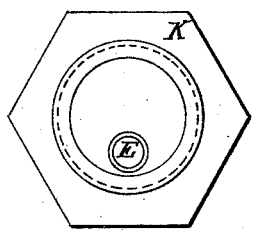 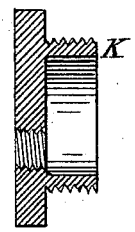
Witnesses:
John W. Ripley
Mac A. Van Deusen
Inventors.
Samuel Dusenbury Tompkins
Thomas Hilton Williams by
S. J. Gordon, their Atty.

UNITED STATES PATENT OFFICE.

SAMUEL DUSENBURY TOMPKINS AND THOMAS HILTON WILLIAMS, OF JERSEY CITY, NEW JERSEY.

STEAM OR HOT-WATER RADIATOR.

SPECIFICATION forming part of Letters Patent No. 397,527, dated February 12, 1889.

Application filed January 16, 1888. Serial No. 260,911. (No model.) Patented in Canada June 14, 1887, No. 26,939.

*To all whom it may concern:*

Be it known that we, SAMUEL DUSENBURY TOMPKINS and THOMAS HILTON WILLIAMS, both of Jersey City, county of Hudson, State of New Jersey, have invented new and useful Improvements in Steam or Hot-Water Radiators, (previously patented in Canada by Letters Patent No. 26,939, dated June 14, 1887,) which are fully set forth in the following specification and accompanying drawings, in which—

Figure 1 is an upright sectional pipe-radiator constructed according to our invention; Fig. 2, an end section thereof with legs attached; Fig. 3, an intermediate section; Fig. 4, legs of an end section detached; Fig. 5, a vertical cross view on the dotted line shown on Fig. 1 at B'. Fig. 5$^a$ is a vertical section through one segment of the radiator on line B$^2$ B$^2$ of Fig. 5; Fig. 6, a horizontal cross view on the dotted line shown on Fig. 2 at A'; Fig. 7, the lock-nut nipple to connect sections at the top; Fig. 8, the lock-nut; Figs. 9 and 10, side and ends views of the eccentric plug; Figs. 11 and 12, side and end views of the straight nipple connecting the sections at the bottom.

The object of our invention is to construct a three-pipe radiator, adapted for use with either steam or hot water, capable of being put together with great economy and facility. This object is attained by the use of a peculiar lock-nut-nipple connection at the top of each of the several sections and straight nipple-connections at the base.

A further object is to construct plugs for the supply and return pipes capable of receiving pipes of various sizes without changing the size of the plug-receiving orifice, and this we accomplish by making the plugs screw-threaded, whereby they may be readily detached and replaced by others, and by making each with a pipe-receiving opening eccentric to the periphery of the plug, so that the pipe may be joined to the radiator at the lowest possible point.

In the drawings, A represents the compound sectional base of the radiator; B, B', and B$^3$, the legs thereof; C, C', and C$^2$, the vertical tubes; D, the inlet of steam and water passage G; E, the outlet of steam and water passage G; H, the air-pipe; I, the lock-nut nipple; J, the lock-nut; K, the eccentric plug; L, the straight nipple; N, the boss at base of a section composed of tubes C, C', and C$^2$; P, the shoulder on lock-nut nipple I. These devices are united into a radiator as follows: Compound base A is formed by connecting several sections of the three vertical tubes C, C', and C$^2$, cast in one piece, together by interposing straight nipple L, having previously introduced lock-nut nipple I into the passage of air-pipe H in one section to connect it with the next adjacent section.

The insertion of lock-nut nipple I is effected by reason of its novel construction.

Lock-nut J is turned up toward solid shoulder P, introducing the lock-nut end of nipple I into air-tube orifice H sufficient to secure the clearance of the other end from the adjacent section when in position. Applying a wrench to shoulder P, the lock-nut end of nipple I is unscrewed from orifice H of the first section and the shoulder end of nipple I screwed into air-orifice H of the adjacent section. Lock-nut J is then turned up rigidly against the first section. Eccentric plug K is now placed in position upon the ends of the two outer sections, to which, if not cast therewith, legs B B are attached. These legs are of peculiar formation, as may be seen in the drawings, Figs. 3 and 4, exhibiting shoulders and circular shapes, to which boss N at the base of the section composed of vertical tubes C, C' and C$^2$ conforms, and by which, when the parts are conjoined, a rigid and secure attachment is effected. Eccentric plug K has its orifice at one side of the center, that the orifice may be always brought, when the plug is applied to a section, to the lowest point of steam and water passage G, thereby securing the certain flow of the water of condensation outward, and leaving the vertical tubes and compound base free for the rapid and uninterrupted circulation of steam or water through the same, the confined air having escaped through pipe H when its valve was open.

The action of the apparatus is as follows: Steam entering at inlet D, the valve of air-pipe H having first been opened, rushes into and through central tube, C', and down outer tubes, C and C², producing a positive circulation. When water is the heating medium, similar action takes place, the gradual warming and rising column of fluid displacing primarily the cold water in central tube, C', and, secondarily, that in outer tubes, C and C².

It is obvious that the radiator described combines the essential requisites of cheap construction, the parts being few, ready, and quick-placing in position to an indefinite extent, as the size of the building may require, and the highest attainable efficiency, whichever agent is employed to distribute heat.

The number of tubes in a section may be multiplied, a central tube or tubes being relatively maintained to act, as hereinbefore explained, in conjunction with its or their neighbors.

What we claim as our invention, and desire to secure by Letters Patent, is—

1. A compound radiator composed of interchangeable sections united at their bases by screw-nipples, and having at their tops coincident screw-threaded openings, in combination with corresponding continuous screw-thread nipples, exhibiting a lug which forms a shoulder nearer one end than the other thereof, substantially as described.

2. The combination, with a radiator composed of interchangeable sections, of a removable plug at the inlet end having an eccentric hole above its center and a removable plug at the outlet end having a hole below the center, substantially as described.

3. A compound sectional radiator composed of sections having openings of equal sizes at their bases, in combination with nipples extending into the openings of the adjacent sections, the outlet and inlet sections having plugs with eccentric openings, which plugs are of the same size as the nipples, substantially as described.

SAMUEL DUSENBURY TOMPKINS.
THOMAS HILTON WILLIAMS.

Witnesses:
S. J. GORDON,
JOHN W. RIPLEY.